INVENTOR.
RUSSELL V. HALL

Feb. 23, 1965   R. V. HALL   3,170,276
AIR SUPPORTED LAWN MOWER
Filed June 18, 1962   2 Sheets-Sheet 2

United States Patent Office 3,170,276
Patented Feb. 23, 1965

3,170,276
AIR SUPPORTED LAWN MOWER
Russell V. Hall, P.O. Box 23, Kinderhook, Ill.
Filed June 18, 1962, Ser. No. 203,069
4 Claims. (Cl. 56—25.4)

The present invention generally relates to power lawn mowers of the rotary blade type and, more particularly, to a mower of the aforesaid type which is supportable on a cushion of air so that it may be moved about freely and effortlessly over the surface of a lawn.

A broad object of the present invention is to provide a novel air-supported lawn mowing means suitable for the care of finely kept lawn surfaces or the like whereby indentations in the lawn surface, due to the concentration of the weight of the mower upon conventional supporting wheels, are entirely avoided.

Another object is the provision of a lawn mower which is air-supported thereby permitting an operator to swing the mower over the lawn surface in a free sweeping manner without regard to a set pattern of mower travel as required by known wheel-supported mowing apparatus.

Yet another object is the provision of a lawn mower which is operable in a labor-saving manner whereby an operator need not walk behind the mower as it traverses the lawn surface, but the operator may, instead, mow generally circular lawn areas merely by pivoting about a center occupied by the operator to swing the mower in overlapping concentric arcs.

A more specific object is to provide a mower of the aforedescribed character wherein the mower housing defines a plenum chamber which opens to a supporting lawn surface and directs compressed air thereagainst to produce a lifting reaction between the surface and the housing sufficient to support the weight of the mower on an air cushion.

Another specific object is to provide an air-supported lawn mower wherein means are provided for regulating the lift reactance operating upon the mower housing thereby to control selectively the height of the mower cutting blade above the supporting lawn surface.

Still another specific object is to provide a clutch mounting means for the rotary cutting blade of an air-supported mower which permits starting of the mower without blade rotation thereby enabling a lift-producing impeller to attain operating speed independently of cutter blade rotation.

Yet another more specific object is to provide a lawn mower having an engine driven crankshaft which supports in spaced relation and drives a grass cutting blade and an impeller blade, the latter producing a cushion of air for supporting the mower above a lawn surface.

Another object is to provide a mower of the type under consideration which is characterized by simplicity and ease of operation and is inexpensive to manufacture and maintain.

Other more detailed objects and advantages of the present invention will become apparent as the description proceeds when taken in connection with the accompanying drawings in which.

Figure 1:
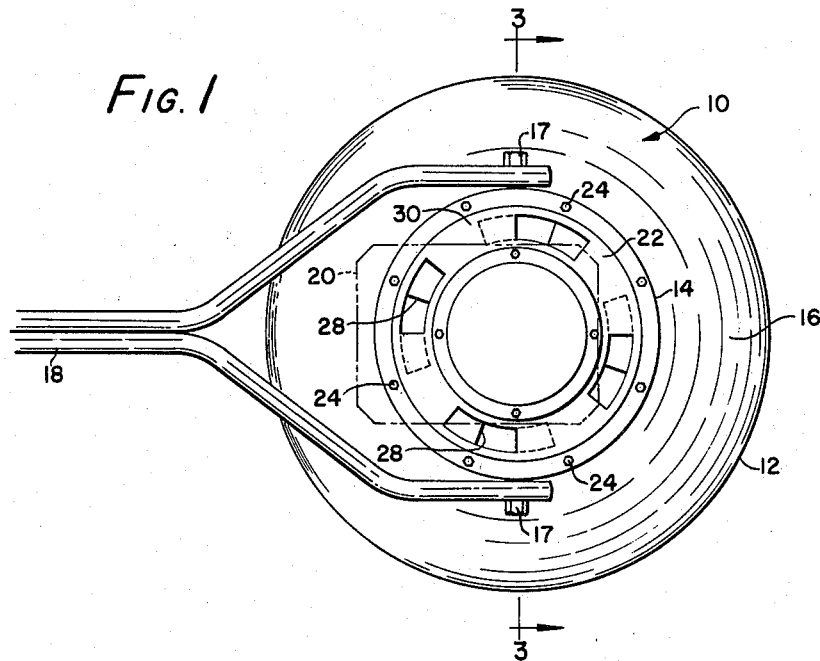
FIG. 1 is a top plan view of an illustrative embodiment of the present invention.

Referring to the drawings, the numeral 10 generally indicates an upper housing member or casing for a power lawn mower constructed in accordance with the present invention. The housing 10 may be fabricated by stamping or molding light-weight sheet metal or composition material to provide a lower cylindrical skirt 12 and an upper cylindrical base support 14 which are integrally connected by a frusto-conical body 16. Attached to the base support 14 by fasteners 17 is an operator's control handle 18 for manipulating the mower with respect to a lawn surface 19 in a manner to be described.

Figure 3:
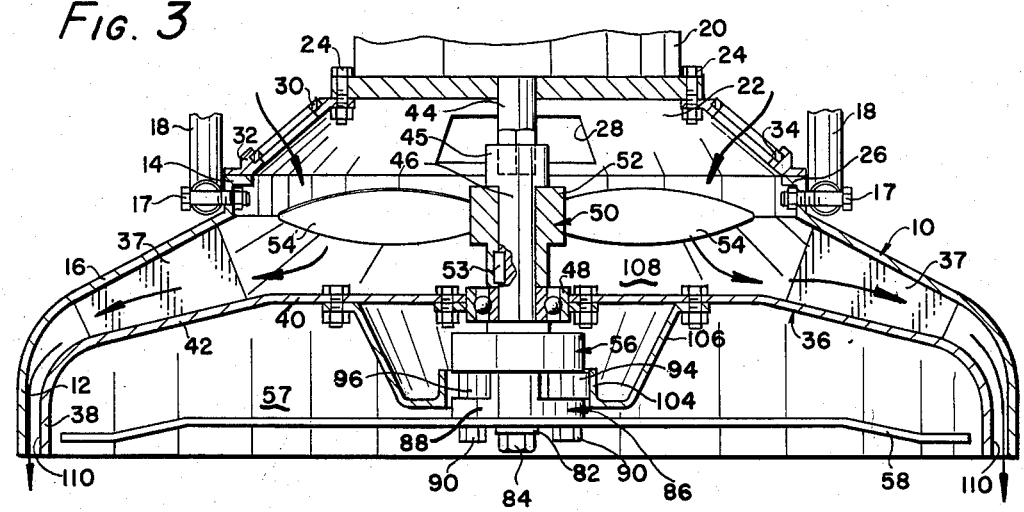
FIG. 3 is an enlarged sectional view taken substantially along lines 3—3 of FIG. 1.

A rotary driver 20, which may comprise, for example, a gasoline engine or an electric motor, is mounted on a frusto-conical mounting base 22 by means of circumferentially spaced fasteners 24. The mounting base 22 is rigidly attached by any suitable means to a flange 26 formed on the base support 14. As best illustrated in FIGS. 1 and 3, elongated inlet ports 28 are evenly spaced about the sloped wall portion of the mounting base 22; and, a port closure ring 30 surrounds the base 22 in intimate bearing relation thereto. The lower marginal edge of the closure ring 30 is slidably received and retained in an annularly grooved enlargement 32 formed on the base 22. The closure ring 30 is provided with slots 34 corresponding in dimension with the aforementioned inlet ports 28 and registrable therewith to a determinable degree in response to selective rotation of the closure ring 30 about the base 22.

Disposed within the housing 10 is an inverted, dish-shaped lower housing member 36 which is supported in spaced relation to the interior surface of housing 10 by a plurality of radially extending brackets or webs 37 shown in FIG. 3. The housing member 36 comprises a depending skirt 38, a substantially flat, centrally apertured top 40 and an integral frusto-conical portion 42. The skirts of the upper and lower housing members, 12 and 38 respectively, are concentric and radially spaced and the lower skirt perimeters are in axial registration as shown in FIG. 3. Preferably, the lower housing member 36 is made from the same material as the upper housing member 10 and by a similar process.

The lower end of a crankshaft 44 of the rotary driver 20 depends downwardly into the mounting base 22 for drivingly engaging an interfitting recess in the enlarged upper end 45 of a rotary driveshaft 46 which is vertically supported and journalled by an antifriction bearing 48 secured in a central opening of housing member 36. An impeller, generally indicated by numeral 50, is provided with an integral hub 52 which is keyed to the driveshaft 46 by key 53 and is axially supported in surrounding relation thereto between a shoulder defined by the enlarged shaft end 45 and the inner race of bearing 48. A plurality of circumjacent blades 54 extend radially from the impeller hub 52 and are rotatable therewith for a purpose to be described.

Figure 4:
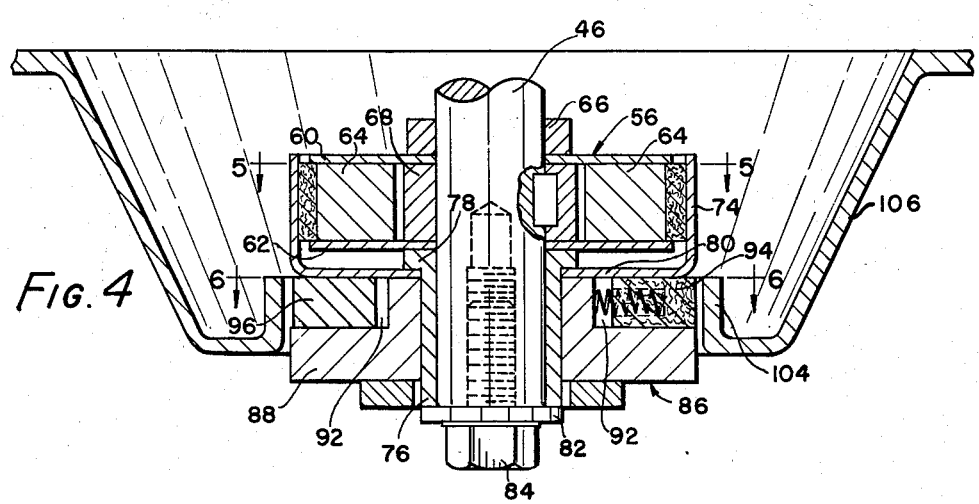
FIG. 4 is an enlarged sectional view of a clutch assembly shown in elevation in FIG. 3.
Figure 5:
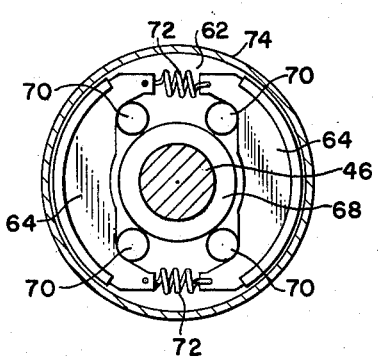
FIG. 5 is a reduced sectional view taken along lines 5—5 of FIG. 4.

A clutch assembly, generally indicated by numeral 56 and shown in detail in FIGS. 4 and 5, is disposed within a cutter blade chamber 57 and cooperates with the driveshaft 46 to connect automatically a cutter blade 58 in driving engagement with the rotary driver 20 in response to the crankshaft 44 having achieved a predetermined rotational speed. The clutch assembly 56 includes axially spaced upper and lower circular plates 60 and 62, respectively, which coaxially surround the driveshaft 46 and provide bearing surfaces for a pair of like centrifugal shoes 64 which are shiftably retained therebetween. An annular collar 66 spaces the upper plate 60 from the inner race of the bearing 48. The plates 60 and 62 are rigidly secured to a central hub 68 keyed to driveshaft 46 and are interconnected by four spaced posts 70 extending perpendicularly therebetween. As shown in FIG. 5, the centrifugal shoes 64 are reversely turned and are resiliently held in abutment with the posts 70 by means of a pair of coiled springs 72 attached between adjacent ends of the shoes. With the clutch parts in the declutched condition, shown in FIG. 5, the shoes 64 are spring biased against the posts 70 thereby providing rotational running clearance between the outer arcuate surface of the shoes and the inner cylindrical wall of a surrounding clutch drum 74. The shoes 64 are shiftable radially outwardly against the bias of springs 72 into frictional driving engagement with the clutch drum 74, as shown in FIG. 4, due to centrifugal force acting upon the shoes as the same are rotated by the driveshaft 46. It will be appreciated that the operation of the aforesdescribed clutch assembly 56 is responsive to the speed of rotation of the rotary driver 20 and that the clutching and declutching action between the shoes 64 and the drum 14 will occur at predetermined rotational speeds dependent upon such factors as the mass of the shoes and the tensional strength of the springs 72.

A sleeve-type bearing 76 journals the lower end portion of the driveshaft 46. A flanged collar 78 is integrally formed at the upper end of sleeve 76 and is fixed to the underlying bottom wall 80 of the clutch drum 74. The extreme upper end surface of the sleeve 76 provides a bearing surface for the lower circular plate 62 of the clutch assembly; and, the extreme lower end surface of the sleeve 76 provides a bearing surface for a washer 82 which is non-rotatively attached to the driveshaft 46 by means of a threaded fastener 84.

Figure 6:
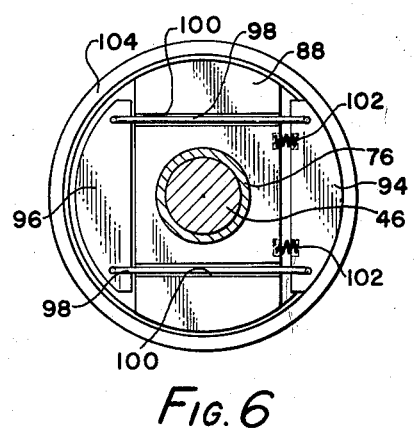
FIG. 6 is a reduced sectional view taken along lines 6—6 of FIG. 4.

Although the major objects of the present invention may be achieved by directly connecting both the clutch drum 74 and the cutter blade 58 to the sleeve 76, I prefer to provide a centrifugally operable brake assembly, generally indicated by numeral 86, therebetween for a purpose to be described. Thus, a brake shoe carrier 88 is coaxially fixed about the sleeve 76, as shown in FIG. 4, and the cutter blade 58 is removably attached to the extreme lower surface of the carrier by bolts 90. Oppositely disposed recesses in the carrier 88 cooperate with overlying portions of the clutch drum bottom wall 80 to define radially opening chambers 92 which shiftably house a brake shoe 94 and a counterweight 96. As seen in FIG. 6, the brake shoe 94 is operatively linked to the counterweight 96 by a pair of spaced rods 98 which extend therebetween through grooves 100 relieved in the extreme upper surface of the carrier 88. Between the brake shoe 94 and a laterally adjacent wall portion of the carrier 88 are disposed a pair of compression springs 102 which normally bias the brake shoe and the counterweight toward the right, as viewed in FIG. 6, to effect frictional braking engagement between the brake shoe 94 and an upturned cylindrical wall 104 of a conical brake drum 106 which is secured to the aforementioned lower housing member 36 in the manner shown in FIG. 3. In response to rotation of the carrier 88 by the driving output of the clutch assembly 56, the counterweight is centrifugally shifted radially outwardly within its chamber 92 to disengage the connected brake shoe from the wall 104 of the brake drum 106, as shown in FIG. 4. Running clearance is provided between the carrier 88 and the brake drum 106.

As best illustrated in FIG. 3, the upper and lower housing members 10 and 36 define therebetween a chamber or plenum 108. With the rotary driver 20 energized to drive the impeller 50, air will be drawn from the atmosphere, through slots 34 in the closure ring 30 and the aligned inlet ports 28 to the revolving impeller blades 54. The impeller 50 will place the intake air under pressure and will discharge it radially outwardly and downwardly through an annular exhaust nozzle or orifice 110 defined between the skirt portions 12 and 38 of the inner and outer housing members 10 and 36, respectively.

Figure 2:
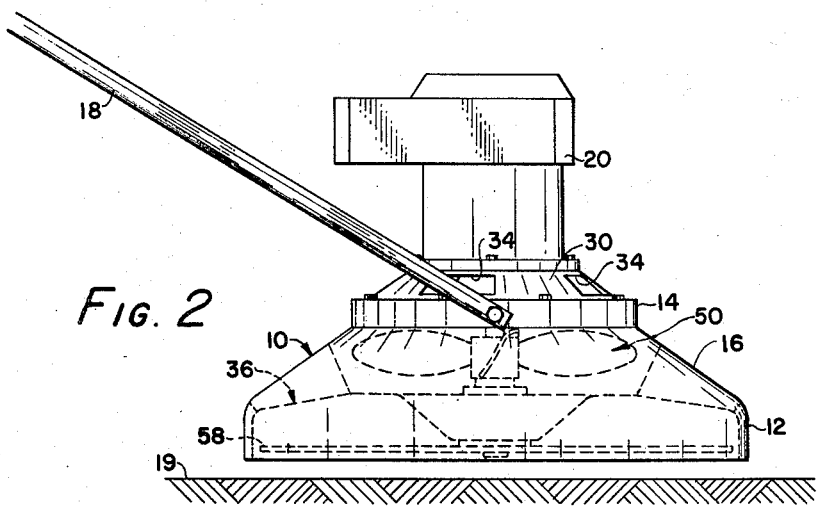
FIG. 2 is a side elevation of the mowing apparatus shown in FIG. 1 wherein the mower is shown in air-supported, spaced relation to a lawn surface.

The air under pressure discharged from the plenum 108 will react between the lawn surface 19 and the housing member 10 to support the mower in a stable, upright position shown in FIG. 2. The area of the effective pressure reactance surface defined by housing member 10 is related to the weight of the entire mower and to the capacity of the impeller 50 to discharge air through the nozzle 110 so that a supporting cushion of flowing air will be created between the lawn surface 19 and the housing 10 when the rotary driver is energized. With the mower so supported, an operator may move the mower in any selected direction over the lawn surface with only slight effort since the resistance to movement of the mower is substantially unopposed by friction. Thus the mower operator is free to swing the mower in an arcuate path from a stationary position if so desired. Other mowing patterns very much different from those possible with a conventional wheel-supported mower may be devised. It will be appreciated that the present mower very greatly facilitates close and careful mowing about irregular lawn borders and obstacles such as flower beds and fences. Furthermore, the weight of the mower is cushioned by the supporting air flow thereby entirely eliminating undesirable wheel marking in the lawn surface. This invention also contemplates that excess air discharged from the nozzle 110 will flow radially outwardly about the entire lower periphery of the mower housing thereby tending to discharge severed grass cuttings upon the lawn surface in an even pattern without undesirable clumping.

Prior to energization of the rotary driver 20, the weight of the mower is supported by the lower periphery of the inner and outer housing skirts 12 and 38 which bear directly against a ground surface. When the rotary driver 20 is energized, the impeller 50 will be brought up to a speed sufficiently great to deliver air through the nozzle 110 to lift and thereafter to support the mower in the position shown in FIG. 2. Preferably, the clutch assembly 56 is operable to maintain the cutter blade 58 in a declutched condition until the driveshaft 46 and the attached impeller 50 are revolving at a lift-producing speed. Thus the clutch shoes 64 will shift radially outwardly into frictional driving engagement with the clutch drum 74 only after the driveshaft 46 has achieved a running speed equal to or greater than that required by the impeller 50 to produce lifting of the mower.

By means of the frictional braking action between the brake shoe 94 and the conical brake drum 106, the aforedescribed brake assembly 86 prevents rotational drifting of the cutter blade prior to effectuation of positive rotary driving engagement of the clutch 56. However, upon actuation of the clutch 56 and consequent rotation of the carrier member 88, the counterweight 96 will be centrifugally shifted to the position shown in FIG. 4 to release the attached brake shoe 94. Preferably, the biasing force produced by the springs 102 is strong enough to urge the brake shoe 94 against the brake drum 106 to prevent unintended rotation of the cutter blade 58 without impeding rotation of the blade when the clutch 56 begins to deliver driving rotation to the cutter blade.

Provision is made to maintain lift producing impeller rotation in the event the rotating cutter blade 58 is stopped or slowed down by striking an object or by encountering a particularly heavy stand of grass or other vegetation. To accomplish this important feature of the invention, the clutch assembly 56 will declutch the cutter blade from the driveshaft 46 when the rotational speed of the clutch shoes 64 falls below a speed sufficient to centrifugally maintain the clutch shoes 64 in the driving position shown in FIG. 4. Thus the drive shaft and the impeller 50 driven thereby continue to rotate at rotary driver speed without appreciable diminution in the speed or lifting force of the impeller.

Another important feature of this invention is the provision of means for regulating the lift produced by the impeller 50 whereby the height of the cutter blade 58 above the supporting lawn surface may be selectively controlled while maintaining a preselected optimum speed for the rotary driver 20 and the cutter blade. This is simply and efficiently accomplished by regulating the supply of intake air to the impeller 50 by manipulation of the aforedescribed closure ring 30 to adjust the effective area of the inlet ports 28 between minimum and maximum valves. To regulate the supply of intake air to the impeller, hence the lift force applied to the mower, the closure ring 30 is rotated in one direction or the other about the mounting base 22 to either increase or decrease the degree of registration of the slots 34 with the inlet ports 28. Where the rotary driver 20 comprises an internal combustion engine, it may be desirable to move the closure ring 30 to a substantially closed position upon starting the engine thereby to starve the impeller 50 and to reduce rotational loading of the impeller blades. However, sufficient air should at all times be supplied to the impeller to produce some lifting of the mower as soon as the engine is started.

In terminating mowing operations, the speed of the rotary driver should be reduced sufficiently to permit declutching of the clutch assembly followed by braking of the coasting cutter blade; however, lift-producing impeller speed should be maintained during the declutching and braking operations to insure that the cutter blade has been brought to a complete stop before the rotary driver is fully de-energized and the mower is permitted to rest upon the ground.

It will be understood that the above description and accompanying drawings comprehend only a general and preferred embodiments of the invention and that various changes in construction, proportion, material and arrangement of the elements thereof may be made without sacrificing any of the above-enumerated advantages or departing from the scope of the appended claims.

What is claimed as new and useful is:

1. In a power mower, in combination:
 housing means comprising spaced, stationary members providing first and second chambers;
 a rotary power source mounted on said housing means;
 rotary cutting means disposed in said first chamber and operatively connected with said power source;
 rotary impeller means for inducing a flow of pressure fluid;
 said rotary impeller means disposed in said second chamber and operatively connected with said power source;
 discharge means for communicating pressure fluid from said second chamber against a supporting surface for effecting a lifting reactance against said housing means sufficient to support the weight of said mower.

2. In a power mower, in combination:
 housing means comprising spaced upper and lower housing members;
 said lower housing member being stationarily fixed to said upper housing member;
 a plenum chamber generally defined between said housing members;
 a cutter blade chamber generally defined between said lower housing member and a horizontal supporting surface for said mower;
 a rotary power source mounted on said housing means;
 a rotary cutter blade disposed in said lower housing member;
 rotary impeller means disposed in said plenum chamber operable to induce a flow of pressure fluid therefrom; and,
 pressure fluid discharge means opening downwardly from said plenum chamber to direct pressure fluid against said supporting surface;
 said pressure fluid reacting between said housing means and said supporting surface to provide air cushion means for supporting the weight of said mower.

3. The combination according to claim 2, wherein said pressure fluid discharge means comprises an annular nozzle defined by radially spaced portions of said housing members and opening between concentric marginal edges of said housing members.

4. In a power mower, in combination:
 housing means defining a plenum chamber;
 a rotary power source mounted on said housing means;
 rotary cutting means operatively connected with said power source;
 rotary impeller means for inducing a flow of pressure fluid;
 said rotary impeller means being disposed in said plenum chamber and operatively connected with said power source;
 discharge means for communicating pressure fluid from said plenum chamber and for effecting a lifting reactance between said housing means and a surface sufficient to support the weight of said mower;
 regulating means for regulating the pressure fluid flow induced by said rotary impeller means thereby controlling the lift force acting upon said housing and the elevation of the housing above said surface;
 said regulating means comprising inlet ports in said housing means for supplying fluid to said rotary impeller means and adjusting means operable to adjust selectively the area of said ports between minimum and maximum values.

References Cited by the Examiner

UNITED STATES PATENTS

| | | | |
|---|---|---|---|
| 2,796,714 | 6/57 | Denney | 56—25.4 |
| 2,862,376 | 12/58 | Thelander | 56—25.4 |
| 3,050,146 | 8/62 | Crim | 180—7 |
| 3,110,996 | 11/63 | Dahlman | 56—25.4 |

FOREIGN PATENTS 219,133  11/58  Australia.

T. GRAHAM CRAVER, *Primary Examiner.*

ANTONIA F. GUIDA, *Examiner.*